No. 761,183. PATENTED MAY 31, 1904.
A. E. SARTAIN.
AUTOMATIC CUT-OFF VALVE FOR GAS PIPES.
APPLICATION FILED JULY 23, 1903.
NO MODEL.

Witnesses
Benjamin Finckel
Thomas P Davis

Inventor
Albert E. Sartain
by Finckel & Finckel
his Attorneys

No. 761,183. Patented May 31, 1904.

UNITED STATES PATENT OFFICE.

ALBERT E. SARTAIN, OF COLUMBUS, OHIO.

AUTOMATIC CUT-OFF VALVE FOR GAS-PIPES.

SPECIFICATION forming part of Letters Patent No. 761,183, dated May 31, 1904.

Application filed July 23, 1903. Serial No. 166,743. (No model.)

*To all whom it may concern:*

Be it known that I, ALBERT E. SARTAIN, a citizen of the United States, residing at Columbus, in the county of Franklin and State of Ohio, have invented certain new and useful Improvements in Automatic Cut-Off Valves for Gas-Pipes; and I do hereby declare the following to be a full, clear, and exact description of the invention, such as will enable others skilled in the art to which it appertains to make and use the same.

The invention relates more especially to the class of valves that are adapted to be automatically operated to close the pipe upon an abnormal reduction or a cutting off of the pressure of the gas in the pipe, the purpose of such valves being to prevent the flow of gas into the house and the consequent danger of explosion or asphyxiation should the fire or lights be extinguished because of such reduction or cutting off of pressure.

The present invention consists in an improved construction hereinafter described and claimed.

Figure 1:
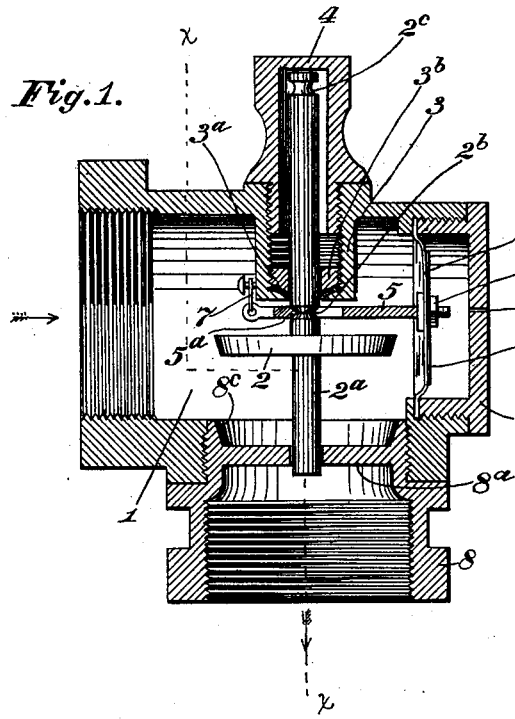
Figure 2:
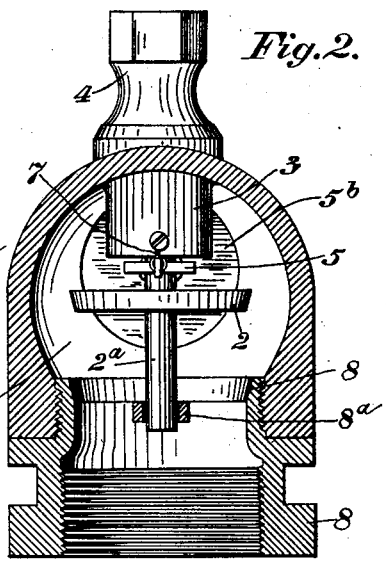
Figure 3:
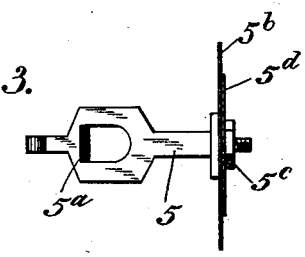
Figure 4:
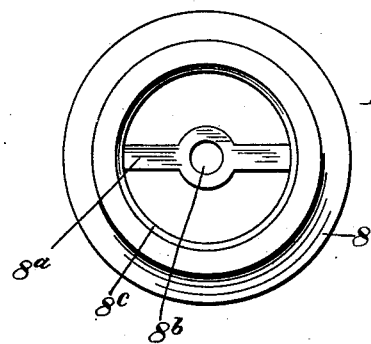

In the accompanying drawings, Figure 1 is a central sectional view through the valve-chamber and valve-latching devices. Fig. 2 is a sectional view on the planes indicated by the line $x$ $x$, Fig. 1, looking toward the left. Fig. 3 is a view of the valve-latch and its support alone. Fig. 4 is a top plan view of the lower section of what is shown in Figs. 1 and 2, said section containing the perforated bridge constituting the guide of the stem at the under side of the valve.

1 designates the valve-chamber or casing, and 2 the valve. The valve has a central stem $2^a$ extending from both the upper and lower sides thereof. The upper portion of the stem is made with a V-shaped notch or groove $2^b$.

3 designates an internally-threaded socket cast and projecting down into the upper part of the valve-casing. The upper end of the valve-stem works vertically through an opening in the bottom of said socket. To prevent the escape of gas around the valve-stem where it passes through the bottom of the socket 3, there is provided a packing-ring or washer $3^a$, seated on an inclined seat in the bottom of the socket and held in place by a nut $3^b$, having a conical lower end conforming to the inclined seat of the washer $3^a$. Gas-pressure thus tends to press the protruding inner edges of the washer $3^a$ about the valve-stem. The extreme upper end of the valve-stem is shaped as seen at $2^c$ to permit that end to be easily taken with the fingers to lift the valve into latched position, as hereinafter described. A threaded cap 4 is employed to close the socket 3 and aid in preventing possible escape of gas and tampering with the valve-stem.

5 designates the latch for normally holding the valve 2 up off its seat. This latch, as shown in Fig. 3, consists of a small plate enlarged at one end and made with an opening through which extends the upper end of the valve-stem. The inner edge forming this opening is made V-shaped, as indicated at $5^a$, or so as to be adapted to engage the notch or groove $2^b$ in the valve-stem. The shank of the latch 5 is secured to a flexible diaphragm $5^b$, preferably of leather, by means of a nut $5^c$ and a large washer $5^d$. The latch 5 operates at right angles to the stem $2^a$. The diaphragm $5^b$ is secured at the side of the valve-chamber by means of a hollow threaded cap 6, the cap holding the diaphragm at its edges, so that the center of the diaphragm and the latch can vibrate horizontally. The cap 6 is made with a vent $6^a$ in order that the contained air shall not interfere with the freedom of movement of the diaphragm. The inner end of the latch 5 is suspended so as to be freely movable in a substantially horizontal line by means of a wire hook 7 passed through a hole in the end of the latch and around the shank of a screw tapped into the part forming the socket 3.

$8^c$ designates the valve-seat. This is preferably formed in a section 8, threaded into the lower part of the valve-casing. This section also contains a cross-piece or bridge $8^a$, made with a perforation $8^b$, through which the lower portion of the valve-stem is passed and guided.

Assuming that the parts shown and described are connected with a gas-supply system and that there is gas at normal pressure in such system, the operation is as follows: The cap 4 is removed and the valve lifted from its seat until the latch engages the notch $2^b$. The pressure of the gas on the diaphragm will not only cause said latch to engage said notch, but also hold said latch in engagement with said notch until the pressure on the diaphragm is removed or reduced so far as to permit the valve to descend to the seat closing the supply-opening. If the valve is automatically seated by the cutting off or a reduction of pressure, it may be reset to open position in the same way as before described at any time after the pressure becomes normal. The flow of gas when the supply is used is through the parts in the direction indicated by the arrows, Fig. 1.

What I claim, and desire to secure by Letters Patent, is—

1. An automatically-operative cut-off valve for gas-pipes comprising a valve-chamber, a valve-seat, a rectilinearly-moving valve and stem, a latch to engage said stem arranged to move at right angles thereto and suspended at one end in a pressure-actuated diaphragm and loosely supported within the valve-chamber at the other end.

2. An automatically-operative cut-off valve for gas-pipes comprising a valve-chamber, a valve-seat, a rectilinearly-moving valve and a stem therefor provided with a V-shaped groove $2^b$, a latch 5 to engage said stem having an opening through which the valve-stem passes and a V-shaped edge to engage the aforesaid groove $2^b$, said latch being arranged to move at right angles to the valve-stem and suspended at one end in a pressure-actuated diaphragm and loosely supported within the valve-chamber at the other end.

In testimony whereof I affix my signature in presence of two witnesses.

ALBERT E. SARTAIN.

Witnesses:
GEO. M. FINCKEL,
M. A. CORBETT.